United States Patent [19]
Tarkenton

[11] 3,811,711
[45] May 21, 1974

[54] MULTIPLE CONCRETE TO PLASTIC PIPE ADAPTER

[75] Inventor: Ernest L. Tarkenton, Mineral Wells, Tex.

[73] Assignee: Harsco Corporation, Harrisburg, Pa.

[22] Filed: Oct. 3, 1972

[21] Appl. No.: 294,568

[52] U.S. Cl......... 285/110, 277/DIG. 2, 285/137 R, 285/176, 285/230, 285/DIG. 2
[51] Int. Cl............................................ F16l 39/00
[58] Field of Search........ 285/137 R, 230, 288, 110, 285/176; 277/DIG. 2; 174/37

[56] References Cited
UNITED STATES PATENTS
| | | | |
|---|---|---|---|
| 3,654,965 | 4/1972 | Gramain | 285/137 R |
| 2,259,940 | 10/1941 | Nathan | 285/110 X |
| 3,583,710 | 6/1971 | Burelle | 285/137 R |

FOREIGN PATENTS OR APPLICATIONS
| | | | |
|---|---|---|---|
| 1,398,064 | 3/1965 | France | 285/137 R |
| 1,204,032 | 10/1965 | Germany | 285/110 |
| 1,083,451 | 9/1967 | Great Britain | 285/110 |

Primary Examiner—Thomas F. Callaghan

[57] ABSTRACT

An adapter for connecting a plurality of circular pipes to a rectangular tube to form conduits for electrical wires and communication cables. The adapter has a plurality of passages formed therein having annular shoulders extending into each passage. Surfaces on a pipe when inserted in the passage urge the shoulder and ribs on the outer periphery of the adapter outwardly such that the shoulder seals against the outer surface of the pipe and ribs on the outer surface of the adapter seal against inner surfaces of the tube in which it is inserted.

1 Claim, 5 Drawing Figures

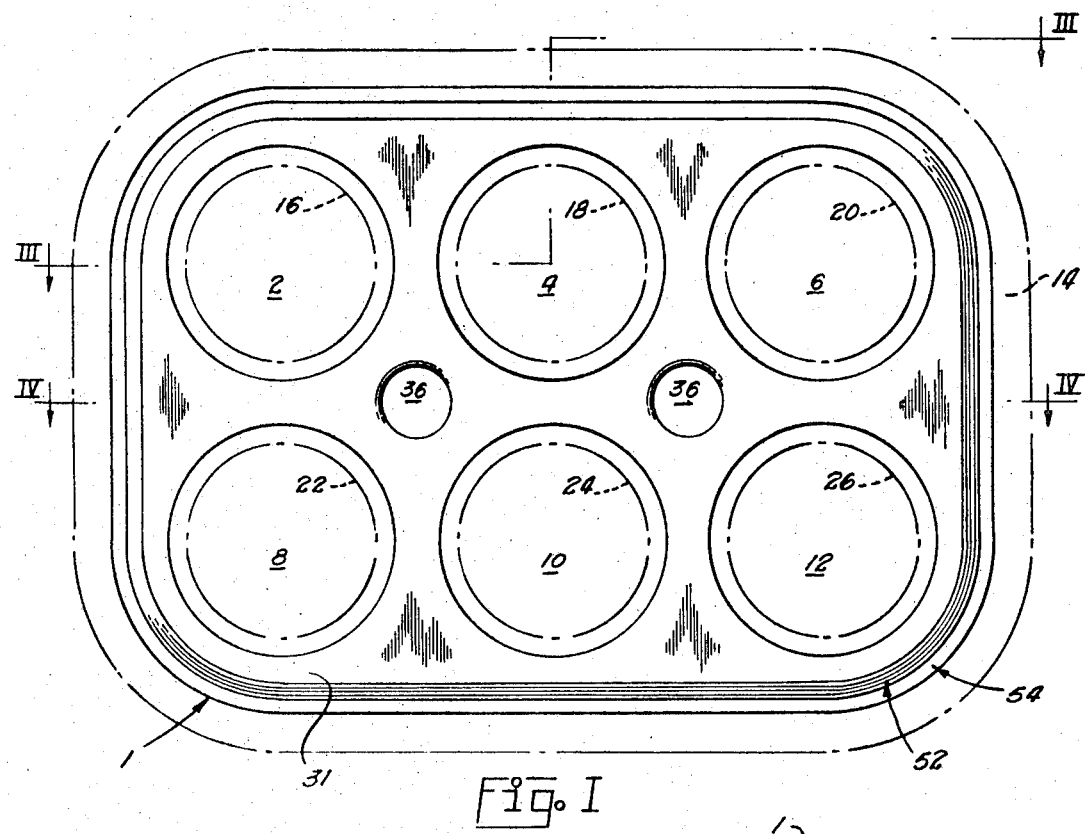
Fig. I
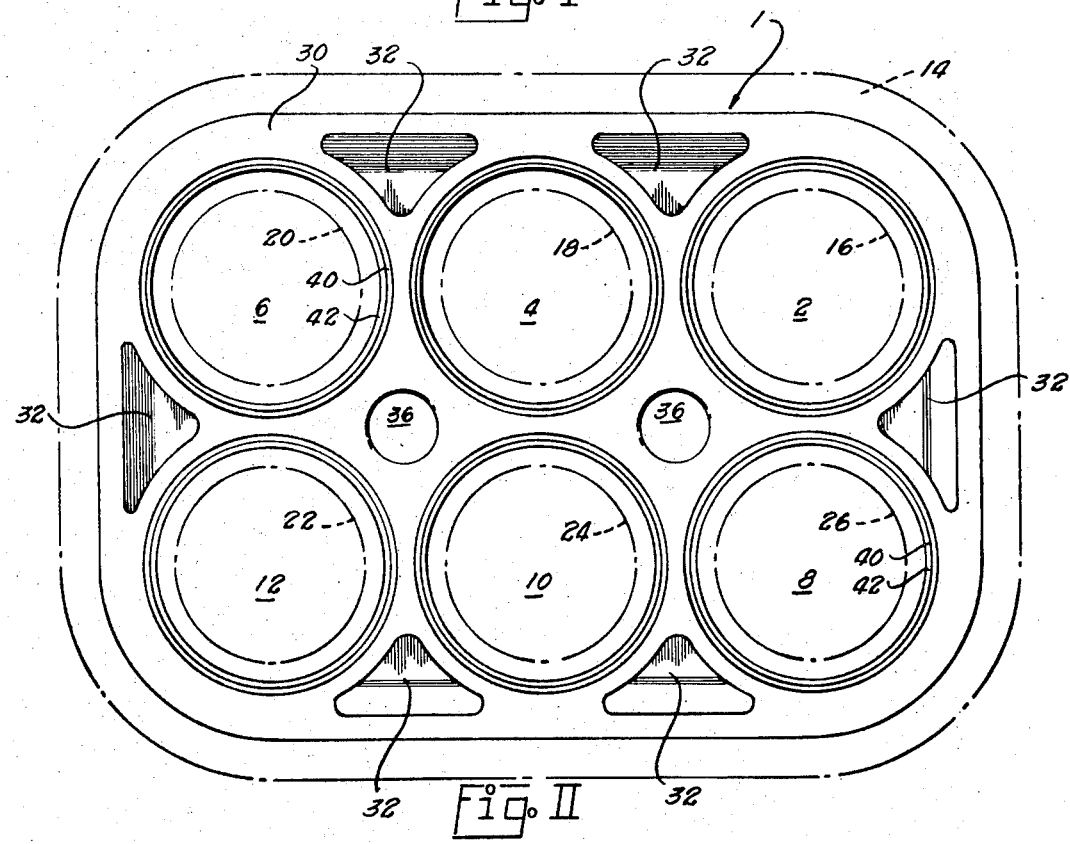
Fig. II

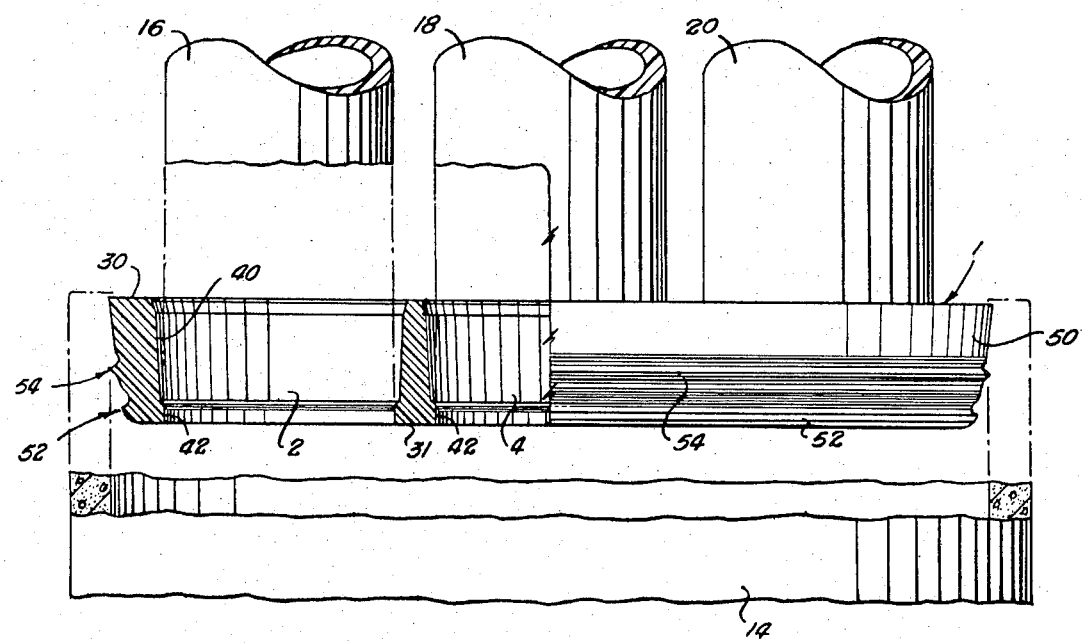
Fig. III
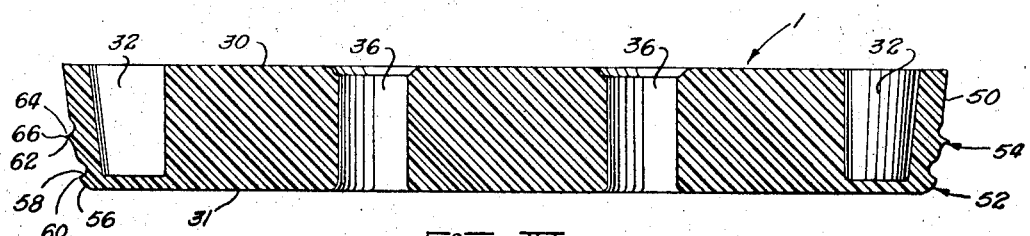
Fig. IV
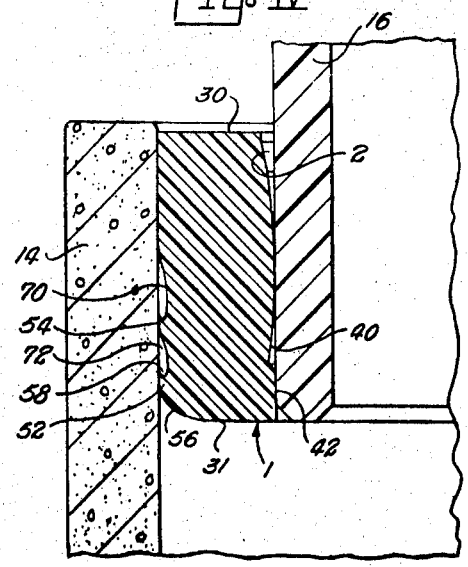
Fig. V

MULTIPLE CONCRETE TO PLASTIC PIPE ADAPTER

BACKGROUND OF THE INVENTION

Electrical and telephone lines are often laid underground and preferably extend through pipes, conduits or tubes.

In such operations large number of lines may extend from a given location through a large rectangular concrete or plastic tube to specified locations where branch lines are routed to specific installations.

Heretofore such lines have been directed through a relatively large rectangular tube constructed of plastic or concrete and have been connected with smaller circular pipes constructed of concrete or plastic. The invention hereinafter described relates to an improved transition adapter for connecting a plurality of circular pipes to a rectangular tube.

SUMMARY OF INVENTION

I have developed an improved adapter which may be made of semi-rigid resilient polyvinyl chloride material to provide transition from a concrete or plastic tube, having multiple passages therethrough to a plurality of rigid plastic or metal tubes. Two annular ribs on the outer periphery of the adapter are urged into sealing relation with the inner surface of the rectangular tube as pipes are inserted and urged into each of a plurality of passages having annular shoulders extending into each passage. The deformation of the adapter as pipes are forcibly inserted into passages in the adapter locks the adapter into the rectangular tube.

The primary object of the invention is to provide transition from a single rectangular tube having multiple raceways extending therethrough to a plurality of pipes having single raceways extending therethrough.

Another object of the invention is to provide an adapter having smooth interior surfaces without sharp corners or protuberance which could damage cable while it is being pulled through the raceways.

A further object of the invention is to provide an adapter arranged to be deformed to provide a positive seal against surfaces of both the rectangular tube and circular pipes to prevent ingress of water, dirt or other foreign material into the raceways which could damage cables or restrict passage of cables therethrough.

A still further object of the invention is to provide an adapter having adequate strength and stiffness to properly align raceways in single passage pipes with raceways in a multiple passage tube to provide a smooth bore in which cables are installed.

A still further object of the invention is to provide an adapter constructed of an improved semi-rigid polyvinyl chloride plastic material particularly formulated to provide sufficient resilience to permit deformation of the adapter into sealing engagement with surfaces of the pipes and the tubular member while providing required stiffness for maintaining alignment between raceways in the pipes and the tubular member.

Other and further objects of the invention will become apparent upon referring to the detailed description hereinafter following and to the drawings annexed hereto.

DESCRIPTION OF DRAWINGS

Drawings of a preferred embodiment of the invention are annexed hereto so that the invention may be better and more fully understood, in which:

FIG. I is an elevational view of the adapter surface which extends into the multiple passage rectangular tube;

FIG. II is an elevational view of the adapter surface which faces outwardly from the multiple passage rectangular tube;

FIG. III is a cross-sectional view taken substantially along line III—III of FIG. I;

FIG. IV is a cross-sectional view taken substantially along line IV—IV of FIG. I; and FIG. V is an enlarged cross-sectional view illustrating the adapter in deformed condition after a pipe has been inserted thereinto.

Numeral references are employed to designate like parts throughout the various figures of the drawing.

DESCRIPTION OF A PREFERRED EMBODIMENT

Referring to FIG. I of the drawing the numeral 1 generally designates a pipe adapter having a plurality of passages 2, 4, 6, 8, 9, 10, and 12 formed therein for providing transition between each of a plurality of raceways extending through a rectangular tube 14 and individual raceways extending through pipes 16, 18, 20, 22, 24, and 26.

As best illustrated in FIG. II the exterior surface 30 of adapter 1 has indentations 32 formed therein to provide sufficient resilience about the walls of passages of 2–12 to permit deformation thereof to assure a continuous seal about the periphery of pipes 16–26 as will be hereinafter more fully explained.

Also illustrated in FIGS. II and IV are breather openings 36 to provide ventilation to the inside of tube 14.

It should be appreciated that openings 36 may be closed by suitable plugs (not shown) to prevent entry of moisture into tube 14.

As best illustrated in FIG. III each of the passages 2–12 has a tapered inner wall 40 diverging outwardly to facilitate insertion of the circular pipe 16 thereinto and to provide deformation of walls of the adapter as will be hereinafter more fully explained. An annular shoulder 42 extends inwardly from the walls 40 forming a reduced diameter portion adjacent the inner surface 31 of adapter 1. Shoulder 42 has an inside diameter less than the outside diameter of pipes 16–26. For example, an adapter to receive four inch outside diameter pipes would preferably have passages 2–12 having a diameter of 4.4 inches tapered to 3.9 inches at shoulder 42.

As illustrated in FIGS. III and IV the outer walls 50 of the adapter are slightly tapered, the periphery of the adapter adjacent the outer surface 30 being longer than the periphery adjacent the inner surface 31 thereof, to facilitate insertion of the adapter 1 into the end of tubular member 14.

The outer surface 50 of adapter 1 has a plurality of annular ribs 52 and 54 formed thereon extending about the periphery of adapter 1.

Rib 52 has a curved convex surface 56 adjacent one side thereof and a concave surface 58 adjacent the other side forming a sharp ridge 60 therebetween.

Rib 54 has concave surfaces 62 and 64 adjacent each side thereof forming a sharp ridge 66 therebetween.

As best illustrated in FIG. V, adapter 1 is positioned inside the end of tubular member 1 prior to inserting cylindrical pipes 16–26 into the passages 2–12 of adapter 1. The tapered outer surface 50 of adapter 1 is preferably of a dimension which permits insertion of inner surface 31 into the tube but requires deflection of rib 54 for moving the adapter into tube 4 a distance sufficient for substantially aligning the outer surface 30 thereof with the end of tubular member 14.

After adapter 1 has been inserted into the end of tubular member 14 the individual pipes 16–26 are inserted into the respective passages 2–12.

By way of illustration, as pipe 16 is urged into the tapered passage 2, the end of the pipe 16 engages the wall 40 of the passage urging the rib 54 extending about the periphery of adapter 1 in sealing engagement with the inner wall of tubular member 14. Further insertion of the end of pipe 16 into the passage 2 results in engagement with shoulder 42 which expands rib 52 into sealing engagement with the inner wall of tubular member 14.

The sharp edged ridges 60 and 66 of ribs 52 and 54 are flexible to conform to the configuration of the inner surface of tube 14, which is usually constructed of concrete. When force is applied by the wall of the tube 14 to deflect ribs 52 and 54 the semi-rigid material of which the body 1 is constructed urges the surfaces adjacent ridges 60 and 66 into sealing engagement with wall of tube 14 and prevents expulsion from the tube 14.

It should further be appreciated that the concave surfaces 58, 62 and 64 form chambers 70 and 72 adjacent the ribs 52 and 54 such that an increase in pressure therein increases the sealing capacity of ribs 52 and 54.

It should be readily apparent that the configuration of passage 2, having a tapered wall 40 with a shoulder 42 adjacent the inner end thereof, and the configuration of the outer wall 50 having ribs 52 and 54 thereon results in a swage fit as the pipe 16 is inserted to prevent leakage of moisture through passage 2 or about the outer surface of adapter 1 into tubular member 14.

Indentations 32, formed as illustrated in FIG. II, providing resilience for accomplishing the seals hereinbefore described and the particular material employed for the construction of adapter 1 has sufficient rigidity to provide sealing at locations along the periphery of adapter 1 between the tangent points of passages 2, 4 and 6.

A typical formulation of the material employed for construction of adapter 1 is as follows:

| | (Parts per 100 parts resin) |
|---|---|
| High molecular dispersion resin | 100 |
| Polymeric or monomeric plasticizer | 60 |
| Inert filler (CaCO$_3$) | 30 |
| Epoxidized soya oil | 5–10 |
| Metallic stabilizer | 2–5 |

The dispersion resin used in this part of the system preferably has an average molecular weight of at least 20,000 and may range over 100,000 without changing its function therein. Normally this is referred to as a vinyl homopolymer, but the resin portion may also contain ratios of a blending resin which may be a copolymer or a lower molecular weight homopolymer. The blending or dispersion resin can be used to reduce viscosity and material cost.

The resin system is well known in the art and includes thermoplastic homopolymers and copolymers derived from vinyl chloride alone or a combination with vinylidene chloride, vinyl acetate or other ester of vinyl alcohol.

Examples of suitable resins would be the homopolymer "Exon 654" made by Firestone Tire and Rubber Company (a high molecular weight polyvinyl chloride polymer resin in powder form), "Geon 121" made by B. F. Goodrich Chemical Company (a vinyl chloride polymer), or "Geon 121" in conjunction with copolymer blending resin "Geon 202" of B. F. Goodrich (a copolymer of vinyl chloride and vinylidene chloride), or homopolymer blending resin "Exon 666" made by Firestone Tire and Rubber Company.

A typical plasticizer would be di-isodecyl phthalate made by B. F. Goodrich Chemical Company and others.

The ratio of plasticizer used in this portion of the process is not critical, although the normal range is from 40–90 parts per 100 parts resin with a preference for the lower range as long as a workable plastisol is attained. As shown above 60 parts per 100 parts resin is preferred.

The inert filler in the formulation acts to harden the plastisol and give additional capacity for plasticizer absorption. The filler may be omitted if desired. A typical suitable for this purpose is "Number 10 White" marketed by Georgia Marble Company.

The epoxidized soya oil acts to give additional water resistance and light stability to the material. Typical of this material is "Admex 672" marketed by Archer-Daniels-Midland Co.

The metallic stabilizer selectively reacts with the hydrochloric acid formed during the fusion operation and prevents degradation of the finished product. A typical metallic stabilizer is "BC–103" distributed by Advance Chemical Division of Carlisle Chemical Works, New Brunswick, New Jersey.

From the foregoing it should be readily apparent that the adapter hereinbefore described accomplishes the objects hereinbefore set forth and that other and further embodiments of the invention may be devised without departing from the basic concept thereof.

Having described my invention, I claim:

1. An adapter to provide transition from a generally rectangular tube including rounded corners to a plurality of single passage circular pipes comprising, a resilient body having a generally rectangular outer surface including rounded corners and having a plurality of circular passages extending therethrough; a tapered outer surface on said body forming a periphery insertable into a rectangular tube; a first annular rib extending about the periphery of the body, said first rib having a convex surface adjacent one side thereof and a concave surface adjacent the other side to form a first sharp edged ridge about the body; a second annular rib extending about the periphery of the body, said second rib being spaced from said first rib and having concave surfaces adjacent each side thereof to form a second sharp edged ridge about the body, the tapered outer surface on said body being of a dimension to permit insertion of said body into a rectangular tube but requiring deflection of said second rib; tapered walls in each of said circular passages; an annular shoulder extending into each of said circular passages and arranged to engage a circular pipe inserted into the circular passage to expand and enlarge the outer periphery of said body; said first rib being moved outwardly into sealing engagement with the inner wall of the rectangular tube upon engagement of said circular pipes with said annular shoulder as circular pipes are inserted into each of said passages to urge said first rib into sealing engagement with the inner wall of the rectangular tube; said concave surfaces adjacent the first and second ribs being positioned to form first and second chambers about the outer periphery of said body.

* * * * *